United States Patent [19]
Povinger

[11] Patent Number: 5,542,392
[45] Date of Patent: Aug. 6, 1996

[54] COMPRESSED NATURAL GAS FUEL INJECTION CONTROL SYSTEM WITH IMPROVED MECHANISM FOR COMPENSATING FOR PRESSURE, TEMPERATURE AND SUPPLY VOLTAGE VARIATIONS

[75] Inventor: Bela P. Povinger, Gross Ile, Mich.

[73] Assignee: Ford Motor Company, Dearborn, Mich.

[21] Appl. No.: 498,307

[22] Filed: Jul. 5, 1995

Related U.S. Application Data

[63] Continuation-in-part of Ser. No. 172,782, Dec. 27, 1993, Pat. No. 5,474,054.

[51] Int. Cl.[6] ................................. F02D 41/34
[52] U.S. Cl. .............................. 123/480; 123/486
[58] Field of Search ............................ 123/480, 486, 123/527; 364/431.05

[56] References Cited

U.S. PATENT DOCUMENTS

| | | | |
|---|---|---|---|
| 4,430,978 | 2/1984 | Lewis et al. | 123/527 |
| 4,512,315 | 4/1985 | Tomisawa | 123/478 |
| 4,664,085 | 5/1987 | Kataoka | 123/478 |
| 4,681,076 | 7/1987 | Müller | 123/488 |
| 5,150,685 | 9/1992 | Porter et al. | 123/478 |
| 5,203,305 | 4/1993 | Porter et al. | 123/478 |

*Primary Examiner*—Andrew M. Dolinar
*Attorney, Agent, or Firm*—Allan J. Lippa; Roger L. May

[57] ABSTRACT

A fuel injection control system suitable for use with internal combustion vehicle engines fueled by compressed natural gas or the like. A conventional liquid-fuel closed-loop injection timing controller establishes the desired fuel delivery rate which is then translated into value which controls the duration of each injection command signal. The rate-to-duration translation is performed by accessing stored values which specify the current operating characteristics of the injectors as determined by sensed fuel pressure, fuel temperature and injector actuation voltage values.

5 Claims, 1 Drawing Sheet

COMPRESSED NATURAL GAS FUEL INJECTION CONTROL SYSTEM WITH IMPROVED MECHANISM FOR COMPENSATING FOR PRESSURE, TEMPERATURE AND SUPPLY VOLTAGE VARIATIONS

CROSS REFERENCE TO RELATED APPLICATION

This application is a continuation-in-part of U.S. patent application Ser. No. 08/172,782 filed Dec. 27, 1993, now U.S. Pat. No. 5,474,054.

FIELD OF THE INVENTION

This invention relates generally to methods and apparatus for controlling the delivery of fuel to an internal combustion engine, and more particularly to apparatus for optimizing the amount of compressed natural gas delivered by electronically controlled fuel injectors as fuel pressure, injector temperature, or injector actuation voltage change.

BACKGROUND OF THE INVENTION

Electronic fuel control systems are increasingly being used in internal combustion engines to precisely meter the amount of fuel required for varying engine requirements. Such systems vary the amount of fuel delivered for combustion in response to multiple system inputs, including throttle angle and the concentration of oxygen in the exhaust gas produced by combustion of air and fuel. Typical electronic fuel control systems operate in a closed-loop mode in response to sensed exhaust oxygen level in order to maintain the ratio of air and fuel at or near stoichiometry.

As described in the above-noted U.S. patent application Ser. No. 08/172,782, it has been found advantageous to augment the capabilities of the electronic fuel injection control system in vehicles powered with compressed natural gas to compensate for variations in fuel pressure, ambient temperature, compressed natural gas temperature, and injector temperature. As disclosed in that prior application, this compensation may be advantageously provided by altering the duration of the fuel injection command signals by a predetermined correction value selected from a previously determined set of such values stored in a lookup table device, the value selection being performed in joint response to both the current fuel pressure and current injector temperature. As further noted in that prior application, the correction value which is used to adjust the injector command signal duration is preferably determined in pan by the current magnitude of the electrical potential supplied to actuate the injectors.

SUMMARY OF THE PRESENT INVENTION

The present invention takes the form of an improved mechanism for controlling the flow of a compressed gaseous fuel, such as compressed natural gas, to an internal combustion engine. In accordance with the invention, the changing fuel delivery characteristics of fuel injectors under different operating conditions are taken into account by storing a plurality of slope and breakpoint values in addressable look-up tables. During engine operation, a fuel control mechanism first determines a desired fuel delivery rate. Then, using sensed values indicating fuel temperature, fuel pressure and the injector actuation voltage, selected slope and breakpoint values are retrieved from the lookup tables and used to optimize injector actuation timing.

In one preferred embodiment of the invention, suitable for implementation using conventional engine control modules, two slope values are used to establish different linear relationships in upper and lower demand ranges respectively, and a breakpoint value specifies the intersection of the two sloped relationships. These three values pre-stored in a lookup table mechanism, selected in response to fuel pressure, fuel temperature and actuation voltage readings, and then used to translate a currently desired fuel flow value into a specific injector timing duration.

These and other features and advantages of the present invention may be better understood by considering the following detailed description of a preferred embodiment of the invention. In the course of this description, reference will frequently be made to the attached drawings.

DESCRIPTION OF THE PREFERRED EMBODIMENTS

As described, for example, in U.S. patent application Ser. No. 08/172,782 noted earlier, it has been recognized that the fuel delivery rate achieved by a natural gas fuel injection system is significantly impacted by variations in the pressure and temperature at which compressed gaseous fuels are supplied, as well as by the voltage of the power source used to actuate the injectors. It has further been recognized that piecewise linear approximations of the relationship between injector pulse width and the fuel delivery rate may be used to advantage to control injector timing. Extensive compressed natural gas (CNG) injector and engine bench testing has revealed, however, that such linear models with fixed slopes do not accurately model injector performance when the fuel delivery system experiences significant changes in fuel temperature, fuel pressure and injector actuation voltage.

In accordance with one aspect of the present invention, it has been determined that a significantly improved model of injector performance can be constructed by means of a piecewise linear approximation consisting of two linear segments having first and second slope values, together with a breakpoint value which specifies the intersection of the two segments.

Figure 1:
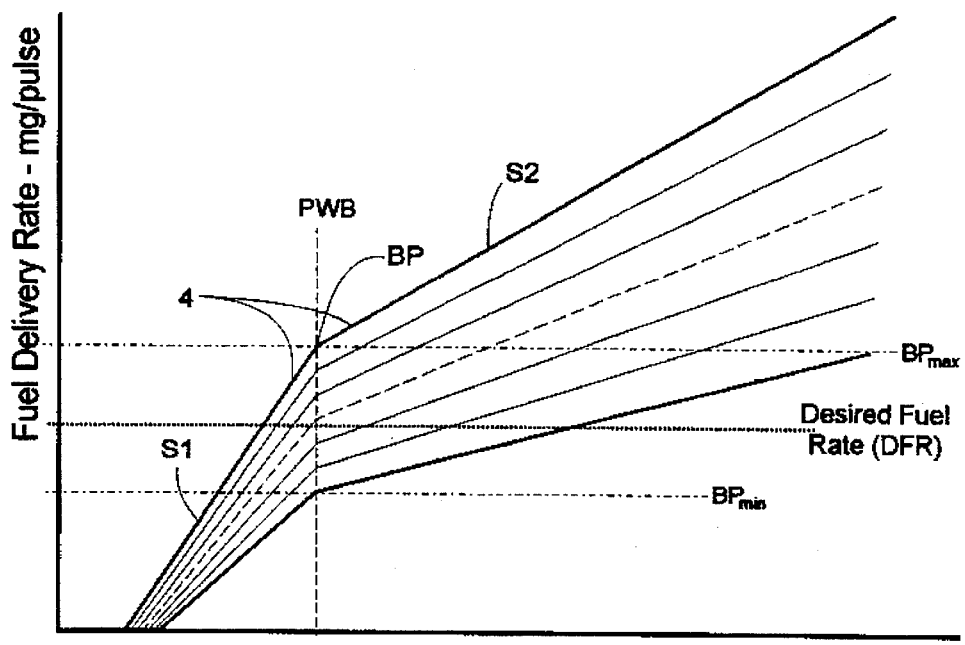
FIG. 1 is a graph illustrating the linear approximations used by one embodiment of the invention to more accurately model the relationship, under varying fuel temperatures, pressures and injector supply voltages, between (1) the rate at which compressed natural gas is delivered by fuel injector pulses and (2) the duration of those pulses.

This model is depicted in FIG. 1 of the drawings. By way of example, the uppermost two-segment injector characteristic indicated at 4 consists of a lower range segment having a slope S1 and an upper range segment having a slope S2, the two segments intersecting at a breakpoint specified by the fuel delivery rate value $BP_{max}$. As seen if FIG. 2, all of the breakpoints used to specify the various characteristics occur at a common injector pulse width PWB; consequently, all breakpoints may be specified by a single delivery rate value alone. Each of the characteristics needed to specify the performance of the injectors over their normal operating ranges are specified by three values: the slope values S1 and S2 and the breakpoint value BP.

As seen in FIG. 1, bench testing has revealed that the slopes of the injector characteristic segments are not only translated vertically as conditions change, but the slopes of the two linear segments also rotate. As an example, testing on one engine system revealed that the slope of the linear segment representing injector performance for shorter injection pulses (lower fuel demand) varied form 0.00261 lbs/sec. At 180° F., 80 psig, and 14 VDC to 0.006032 lbs/sec. at −20° F., 140 psig, and 10.0 VDC, an increase of 231%. Ignoring these changes in the slope of the relationship by using constant slope values results in significantly impaired fuel controller response, and consequently higher exhaust emissions.

Figure 2:
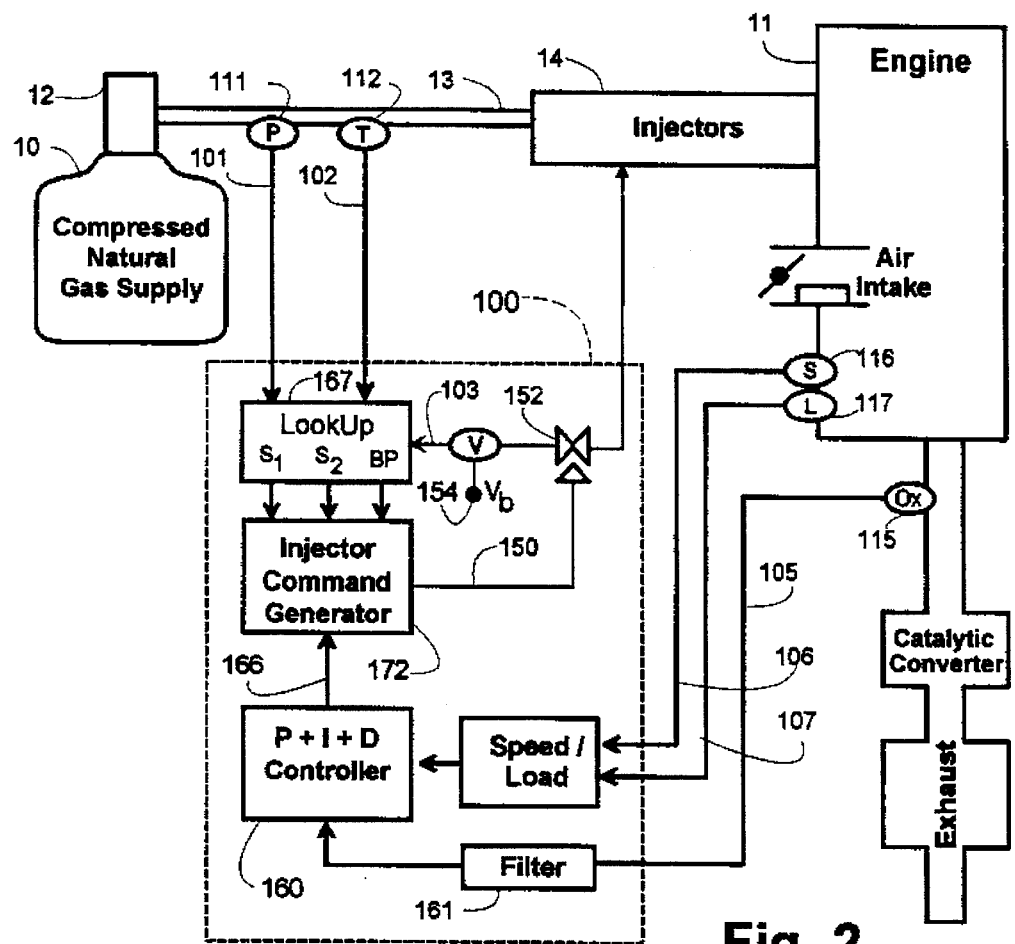
FIG. 2 shows a fuel control system for controlling the fuel delivery rate of a compressed gaseous fuel which embodies the invention.

The fuel control apparatus contemplated by the invention is shown in FIG. 2 and is particularly adapted for use in vehicles powered by non-liquid fuels, such as compressed natural gas (CNG). A tank 10 containing compressed natural gas supplies fuel to an engine 11 via a pressure regulator 12 and a supply conduit 13 to conventional fuel injectors 14 of the type used with vehicles operated on liquid fuels (gasoline, ethanol, methanol, or a mixture thereof).

The amount of fuel delivered to the engine 11 is controlled by a closed-loop fuel controller system 100 which responds to signal inputs indicated at 101–103 and 105–107 in FIG. 2. Signal input 101 provides a fuel pressure value obtained from a fuel pressure sensor 111 in communication with the fuel supply conduit 13. Signal input 102 provides a fuel rail temperature value from a temperature sensor 112 in the fuel supply conduit 13. Sensor 112 is preferably located on the fuel rail near the injectors 14, but sensors in other locations may be used to develop an inferred fuel temperature value. Input signal 105 is obtained from a heated exhaust gas oxygen (HEGO) sensor 115 which is positioned to sense the gases exhausted from engine 11. Input signals 106 and 107 indicate engine speed and engine load respectively. The engine speed signal 106 is typically obtained by the pulse rate from a crankshaft tachometer 116, while the engine load value provided by signal 107 is derived from an intake manifold pressure and other readings collectively represented for purposes of illustration by a sensor 117 seen in FIG. 2.

The fuel control system seen in FIG. 2 develops a command signal, indicated at 150, which controls an electronic switch 152 which supplies an operating potential from a voltage source 154 to open and close the injectors 14. The duration of each command signal 150 determines the amount of fuel delivered to the engine. As noted earlier, the relationship between the duration of the command signal and the rate of fuel delivered to the engine varies in the manner illustrated in FIG. 1. The injector actuation duration is determined by an injector command signal generator seen at 172 which generates an injector command signal having a duration which varies in response to four different inputs:

First, the output 166 of a closed-loop proportional/integral/differential (PID) controller 160 which provides a signal value indicative of the desired fuel delivery rate needed to achieve stoichiometric combustion, a value which is produced in conventional fashion under closed loop control by monitoring the HEGO oxygen level signal 105 and the engine speed and load signals 106 and 107.

Second, a slope value S1 obtained by a lookup table mechanism 167 operation based on the current sensed fuel pressure value 101, the current fuel temperature value 102 and the current injector actuation voltage level 103. The slope value S1 is stored in a lookup table which is preferably implemented using a non-volatile read-only memory which is pre-loaded with values based on bench testing of the particular vehicle configuration at installation time. The slope value S1 specifies the slope of a measured linear relationship between injector pulse duration and the injector fuel delivery rate at a plurality of different engine operating conditions. By way of example, 64 values of S1 may be used to specify this slope value for four (4) different supply voltages, four (4) different gas pressures and four (4) different gas temperatures.

Third, a second slope value S2 is similarly stored in a lookup table and accessed by mechanism 167 the same three variables: fuel pressure, fuel temperature and supply voltage.

Fourth, a breakpoint value BP is also previously determined based on the operating characteristics of the injectors, stored in a lookup unit, and accessed by the mechanism 167 based on current fuel pressure, fuel temperature and injector supply voltage.

An injector command generator 172, preferably implemented with the same micro controller used to implement the closed-loop PID controller 160, translates the desired fuel flow rate value on line 166 from PID controller 160 into an injector command pulse on line 150 whose duration is established by the relationship specified by the values of S1, S2 and BP from the lookup unit 167. The injector pulse width is determined by the processing step specified by the instruction below:

IF $DFR$ <$BP$ THEN $$PW := PWB - ((BP - DFR)/S1)$$

ELSE $$PW := PWB + ((DFR - BP)/S2);$$

where DFR is the desired fuel rate value provided via line 166 from the PID controller 160; S1, S2 and BP are the current slope and breakpoint values from the lookup unit 167, PWB is the pulse width at the breakpoints, and PW is a value indicating the duration of the injector control pulses produced by the generator 172. Within generator 172, the actual pulse duration may be established by a count-down time initialized with the value PW.

The operation of the PID controller 160 is conventional and provides the principle closed-loop control mechanism for establishing the fuel delivery rate. The oxygen level signal 105 from the HEGO sensor is supplied to the PID controller 160 via a low-pass filter 161 which removes high-frequency components from the oxygen level signal. Within the controller 160, the engine's current speed and load conditions as indicated by the values on signal lines 106 and 107 are used in combination with the current oxygen level signal on line 105 to calculate a desired fuel delivery rate value delivered to output line 166. When the oxygen level signal supplied via falter 161 to the controller 160 falls below a predetermined level, indicating a rich condition, the controller's proportional component produces a stepwise deercause in fuel rate output signal, and then begins to gradually and progressively decrease the desired rate value still further until the combustion products reaching the HEGO sensor produce a high oxygen level, indicating a lean condition, whereupon the controller abruptly increases the desired fuel rate signal and begins to gradually and progressively increase it still further using its integral component, causing an increasing amount of fuel to be supplied until the HEGO sensor again detects a rich condition. The cycles continue in this fashion, with the mixture being held at or near stoichiometry as desired. Additional information on the use of such closed-loop control mechanisms is presented by D. R. Hamburg and M. A. Schulman in SAE Paper 800826.

The ability of this closed loop control system to rapidly converge toward stoichiometric conditions is greatly improved by the mechanism contemplated by the present invention, which enables changes in the desired fuel rate value produced by the PID controller 160 to be accurately translated into changes in the duration of injector actuation which will produce those delivery rate changes. As a result, using the principles of the invention, the system more rapidly returns the engine to stoichiometric operation after fuel demand level changes, providing a marked reduction in undesired emissions.

The engine control module 100 is preferably implemented by an available integrated circuit micro controller and memory devices operating under stored program control. Suitable micro controllers are available from a variety of sources and include the members of the Motorola 6800 family of devices which are described in detail in Motorola's Micro controller and Microprocessor Families, Volume 1 (1988), published by Motorola, Inc., Micro controller Division, Oak Hill, Tex.

The injection command signal 150 is synchronized with the rotation of the engine crankshaft, and hence with piston and valve movements, by processing event signals from one or more sensors (as illustrated by the tachometer 116 in FIG. 2) which are applied to the micro controller as interrupt signals. These signals are typically applied to the microprocessor's interrupt terminal (not shown) to execute interrupt handling routines which perform time-critical operations under the control of variables stored in memory. By accumulating these interrupt signals, numerical values indicative of crankshaft rotation can be made available to the adaptive fuel control system.

Analog signal values from sensors, such as the temperature sensor 112, the pressure sensor 111, and the HEGO sensor 115, may be connected to the controller 100 to provide information in the form of analog voltage level signals which are then converted to digital form for processing by means of analog-to-digital (A-D) converters built into the micro controller. The lookup unit 167 preferably stores the slope and breakpoint values S1, S2 and BP in a read-only memory, the values being empirical for a particular CNG injector driver and type of vehicle and being permanently stored along with other engine configuration parameters at the time the fuel delivery system is installed.

While the specific embodiment that has been described is particularly suited for implementation using conventional fuel controller mechanisms used today, it should be understood that more accurate results may be obtained by storing a more elaborate functional model of the relationship between injector duration and fuel delivery rate under changing fuel pressure, fuel temperature and actuation voltage conditions. For example, one or more tables storing multidimensional curved surfaces may be used to represent the rate of change of injector pulse width with respect to changes in the desired pulse rate on a continuous basis, without the discontinuities associated with the piecewise linear approximations which are used in the described embodiment to reduce the computational burden placed on the limited capabilities of conventional processor of the type currently available.

It is accordingly to be understood that the specific mechanisms and techniques which have been described in detail are merely illustrative of one application of the principles of the invention. Numerous modifications may be made to the methods and apparatus described without departing from the true spirit and scope of the invention.

What is claimed is:

1. Apparatus for controlling the flow of a compressed gaseous fuel under pressure from a fuel supply to the intake port of an internal combustion engine, said apparatus comprising, in combination, at least one fuel injector coupled to said fuel supply for injecting measured amounts of fuel into said engine at said intake port in response to a command signal whose duration is indicative of the amount of fuel to be injected, and an electronic fuel control unit comprising:
      memory means for storing a plurality of predetermined slope values, each of said slope values being indicative of the rate at which the amount of fuel delivered to said engine by said injector varies for a given change in said duration of said command signal at a predetermined fuel temperature and fuel pressure,
      means responsive to the temperature and the pressure of said fuel for selecting a particular one of said slope values, and
      second processing means jointly responsive to a variation in said desired fuel rate value from a prior rate value to a new rate value and to said particular one of said slope values for varying the duration of said command signal to achieve the fuel delivery rate indicated by said new rate value.

2. The apparatus forth in claim 1 wherein said apparatus for storing said slope values further comprises:
   memory means for storing a plurality of rate breakpoint values, and
   memory means for storing a second plurality of slope values, and
   wherein said electronic fuel control unit further comprises:
      means responsive to the pressure and temperature of said fuel for selecting a particular one of said breakpoint values, and
      range determining means for selecting said particular one of said slope values from said second plurality of slope values when said desired delivery rate exceeds said particular one of said breakpoint values.

3. Apparatus for controlling the flow of a compressed gaseous fuel to the intake port of an internal combustion engine, said apparatus comprising, in combination, a fuel supply for delivering said gaseous fuel under pressure from an available fuel source, at least one fuel injector coupled to said fuel supply for injecting measured amounts of fuel into said engine at said intake port in response to a command signal whose duration is indicative of the amount of fuel to be injected, means for generating a fuel temperature signal indicative of the temperature of said fuel, means for generating a fuel pressure signal indicative of the pressure at which said fuel is delivered by said fuel supply, a source of an electrical supply potential connected to provide electrical energy to actuate said at least one fuel injector, means for generating a voltage signal indicative of the magnitude of said electrical potential, and an electronic fuel control unit comprising:
      at least one output port connected to deliver said command signal to said fuel injector, a first input port for receiving said fuel temperature signal, a second input port for receiving said fuel pressure signal, a third input port for receiving said voltage signal, at least a fourth port for receiving engine data indicative of the current operating condition of said engine, first processing means responsive to said engine data for generating a desired fuel rate value indicative of a desired rate at which said fuel should be into said engine, memory means for storing a plurality of predetermined slope values, each of said slope values being indicative of the rate at which the amount of fuel delivered to said engine by said injector varies for a given change in said duration of said command signal at a predetermined fuel temperature, fuel pressure and electrical supply potential, second processing means responsive to said fuel temperature signal, said fuel pressure signal and said voltage signal for selecting a particular one of said slope values, and third processing means jointly responsive to a variation in said desired fuel rate value from a prior rate value to a new rate value and to said particular one of said slope values for varying the duration of said command signal to achieve the fuel delivery rate indicated by said new rate value.

4. The apparatus forth in claim 3 wherein said apparatus for storing said slope values further comprises:

memory means for storing a plurality of rate breakpoint values, and memory means for storing a second plurality of slope values, and wherein said electronic fuel control unit further comprises:

means responsive to the pressure and temperature of said fuel for selecting a particular one of said breakpoint values, and range determining means for selecting said particular one of said slope values from said second plurality of slope values when said desired delivery rate exceeds said particular one of said breakpoint values.

5. Apparatus for controlling the duration during which the fuel injectors of an internal combustion engine are actuated to supply compressed gaseous fuel under pressure at a controlled fuel delivery rate to the intake of an internal combustion engine, said apparatus comprising, in combination, first sensing means for generating a fuel temperature signal value indicative of the temperature of the fuel being supplied to said engine by said fuel injectors, second sensing means for generating a fuel pressure value indicative of the magnitude of said pressure, memory means for storing first and second pluralities of predetermined slope values, each of which is indicative of the rate of change of said controlled delivery rate with respect to changes in said duration under predetermined operating conditions, said predetermined operating conditions being specified by the combination of said fuel pressure value, said fuel temperature value, and a range indication, memory means for storing a plurality of breakpoint values indicative of the fuel delivery characteristics of said fuel injectors under said predetermined operating conditions, processing means responsive to the current operating condition of said engine for selecting a particular one of said breakpoint values, processing means jointly responsive to said particular breakpoint value and said current operating condition for selecting a particular slope value from said first and second plurality of slope values, and processing means responsive to said particular slope value and said desired fuel delivery rate value for varying said duration during which the fuel injectors of an internal combustion engine are actuated to vary said fuel delivery rate.

* * * * *